US012579849B2

(12) United States Patent
Adler et al.

(10) Patent No.: US 12,579,849 B2
(45) Date of Patent: Mar. 17, 2026

(54) DETECTING AN UNUSUAL OPERATION OF A VEHICLE OUTSIDE OF A TIME FENCE AND NOTIFYING NEIGHBORING VEHICLES

(71) Applicant: Caterpillar Inc., Peoria, IL (US)

(72) Inventors: Daniel Adler, Peoria, IL (US); Julie Gannon, Peoria, IL (US); Joshua Reed, Galesburg, IL (US)

(73) Assignee: Caterpillar Inc., Peoria, IL (US)

( * ) Notice: Subject to any disclaimer, the term of this patent is extended or adjusted under 35 U.S.C. 154(b) by 180 days.

(21) Appl. No.: 18/467,284

(22) Filed: Sep. 14, 2023

(65) Prior Publication Data

US 2025/0095411 A1      Mar. 20, 2025

(51) Int. Cl.
 *G07C 5/00*      (2006.01)
 *B60R 25/102*      (2013.01)
 *B60R 25/40*      (2013.01)

(52) U.S. Cl.
 CPC ............ *G07C 5/008* (2013.01); *B60R 25/102* (2013.01); *B60R 25/403* (2013.01)

(58) Field of Classification Search
 CPC ...... G07C 5/008; G07C 5/085; B60R 25/102; B60R 25/403; B60R 25/1018; B60R 25/40; G08G 1/20; G08G 1/207
 USPC ....................................................... 701/31.4
 See application file for complete search history.

(56) References Cited

U.S. PATENT DOCUMENTS

| | | | | |
|---|---|---|---|---|
| 7,002,465 B2 * | 2/2006 | Komatsu | ................... | E02F 9/24 |
| | | | | 340/426.2 |
| 7,132,924 B2 | 11/2006 | Kajita et al. | | |
| 11,195,184 B1 * | 12/2021 | Dixon | .................... | G01S 19/13 |
| 2004/0145241 A1 | 7/2004 | Arakawa | | |
| 2008/0084324 A1 * | 4/2008 | Wallace | ................ | G06Q 10/06 |
| | | | | 340/679 |

FOREIGN PATENT DOCUMENTS

| | | | |
|---|---|---|---|
| JP | 3242882 | B2 | 12/2001 |
| JP | 2003027529 | A | 1/2003 |
| JP | 6401002 | B2 | 2/2006 |
| JP | 2006146654 | A | 6/2006 |
| JP | 4741374 | B2 | 8/2011 |
| WO | 2011088005 | A1 | 7/2011 |

OTHER PUBLICATIONS

Written Opinion and International Search Report for Int'l. Patent Appln. No. PCT/US2024/042373, mailed Dec. 6, 2024 (43 pgs).

* cited by examiner

*Primary Examiner* — Tyler D Paige

(57) ABSTRACT

The disclosed system obtains a current time and a time fence indicating a daily time period and determines whether the current time is within the time fence. Upon determining that the current time is outside the time fence, the system operates the battery in a low-power mode, where the low-power mode is configured to conserve power associated with the battery. When the battery is in the low-power mode and the system detects an unusual operation associated with the vehicle, the system sends an indication to multiple monitoring units coupled to multiple vehicles within a predetermined area to send a notification indicating the unusual operation.

20 Claims, 6 Drawing Sheets

TIME

600

DETECTING AN UNUSUAL OPERATION OF A VEHICLE OUTSIDE OF A TIME FENCE AND NOTIFYING NEIGHBORING VEHICLES

BACKGROUND

Commercial vehicle theft is an enormous problem that affects many businesses and individuals. Heavy-duty vehicles, such as the ones used in construction, are expensive machines where an individual machine can cost up to a million dollars. According to the FBI, more than 40,000 commercial vehicles were stolen in the United States in 2019, resulting in losses of over $1 billion. Commercial vehicle theft can disrupt business operations, damage customer relationships, increase insurance costs, and expose sensitive information.

SUMMARY

The disclosed system detects an unusual operation, such as a movement of the vehicle, outside of a time fence. The time fence indicates a daily time period and can be continuous, e.g., from 8 AM to 5 PM, or broken out into various noncontinuous periods, such as 8 AM to noon and 1 PM to 5 PM. The disclosed system can be a detachable unit that includes a radio, an accelerometer configured to detect motion, and a battery, and it can be mounted on a vehicle such as a vehicle used in construction. The detachable unit is sufficiently small to be imperceptible and can be placed in an inconspicuous location, such as underneath the vehicle, so that when an unauthorized party tries to move the vehicle, the unauthorized party cannot easily detect the presence of the detachable unit and remove the detachable unit from the vehicle. Once the detachable unit detects the unusual operation, the detachable unit can send a notification to an operator of the unusual operation and, in addition, can notify other vehicles on the jobsite of the unusual operation. In response, the other vehicles on the jobsite can send their own notifications to their own operators. Further, in response to the unusual operation, all the vehicles can increase the frequency of communicating their location.

BRIEF DESCRIPTION OF THE DRAWINGS

Detailed descriptions of implementations of the present invention will be described and explained through the use of the accompanying drawings.

Figure 1:
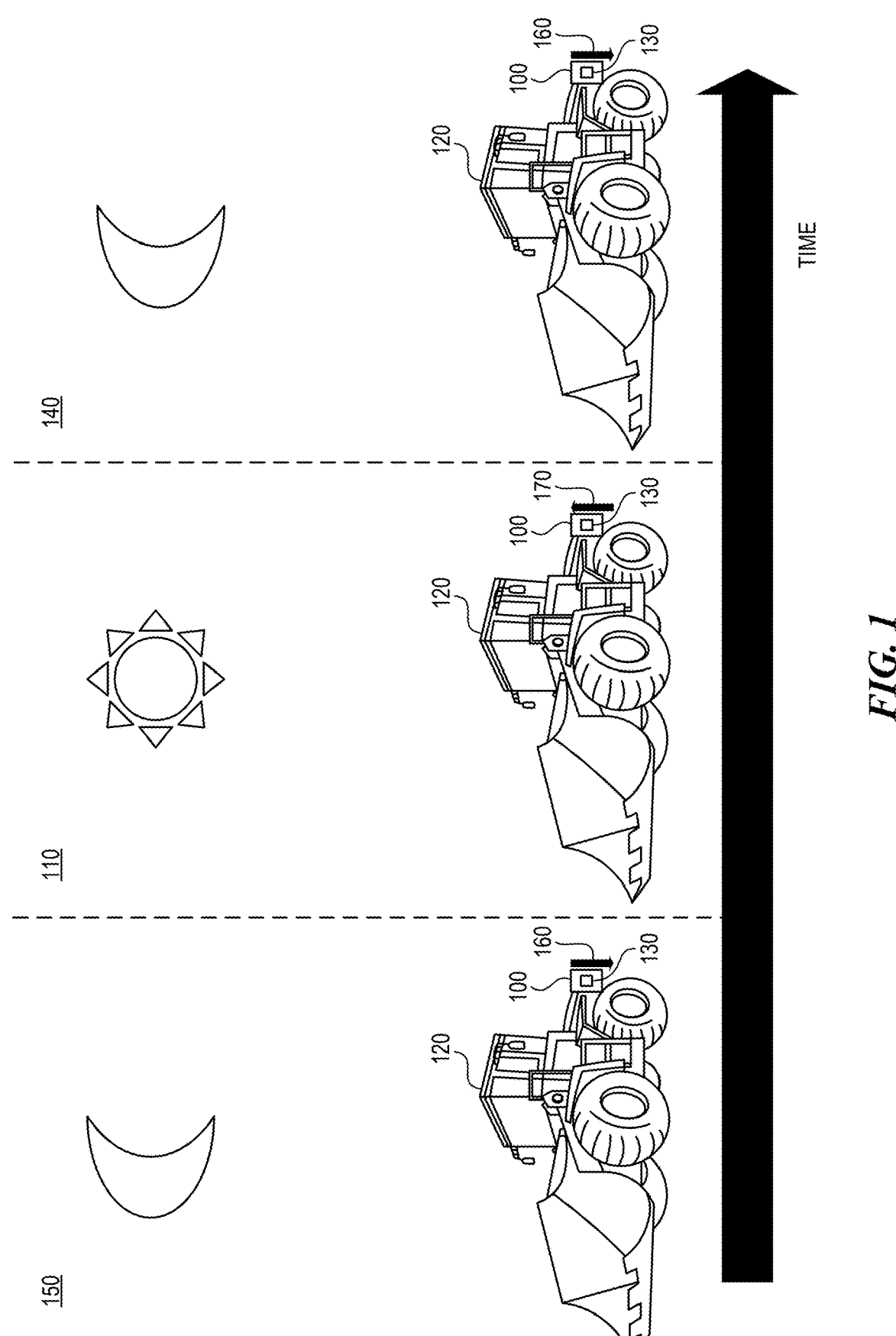
FIG. 1 shows a detachable unit coupled to a vehicle based on a time fence.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Detecting an Unusual Operation of a Vehicle Outside of a Time Fence and Notifying Neighboring Vehicles FIG. 1 shows a detachable unit 100 coupled to a vehicle 120 based on a time fence. The detachable unit 100 (described in more detail below) is a low-cost electronic device that can be coupled, e.g., attached and detached, to any vehicle 120 and can monitor the movement of the vehicle. The detachable unit 100 can be attached using various mechanisms such as tape, glue, hook and loop, magnets, etc. The detachable unit 100 is small in size, e.g., several millimeters in each dimension, and imperceptible, thus making it difficult for a potential thief to identify and remove. The vehicle 120 can be a heavy-duty vehicle specially designed to execute construction tasks, most frequently involving earthwork operations or other large construction tasks.

A time fence 110 is a daily time period during which the vehicle 120, such as heavy construction machinery, is configured to operate at a jobsite. The time fence 110 can be continuous, such as from 8 AM to 5 PM or 9 AM to 6 PM, or the time fence 110 can be discontinuous, such as from 8 AM to noon and 1 PM to 5 PM.

Outside of the time fence 110, such as during time periods 140, 150, the detachable unit 100 switches the battery 130 into a low-power mode 160. The time periods 140, 150 cover the time periods of the day that are outside of the time fence 110. In addition, the time periods 140, 150 can indicate when the vehicle 120 is in a scheduled downtime. The low-power mode 160 enables the battery 130 to preserve power and prolongs the battery life, which needs to last approximately 5 years. In the high-power mode 170, the detachable unit 100 consumes more power than when the detachable unit is in the low-power mode 160. The high-power mode 170 enables the detachable unit 100 to communicate with other nearby devices.

When the battery 130 is in the low-power mode 160, namely, during the time periods 140, 150, a vehicle monitor needs to know if/when the vehicle 120 has been moved at a time when it was not expected to be moved, e.g., after working hours or when the vehicle is supposed to be in a scheduled downtime. The detachable unit 100 can detect an unusual operation 180 associated with the vehicle, such as a movement of the vehicle or powering up of the vehicle 120. When such an unusual operation is detected, the detachable unit 100 can switch to the high-power mode 170 and generate a notification of the unusual operation.

In addition, the detachable unit 100 can check whether the time at which the unusual operation is detected is close to the time fence 110, such as within half an hour of the time fence. If the time at which the unusual operation is detected is close to the time fence, the detachable unit 100 may not generate the notification because the operation of the vehicle 120 may start early or run late. For example, if the time fence 110 starts at 8 AM, and the vehicle is powered at 7:45 AM, the detachable unit 100 can determine that the operation of the vehicle is not unusual because the operation is so close to the time fence.

Figure 2:
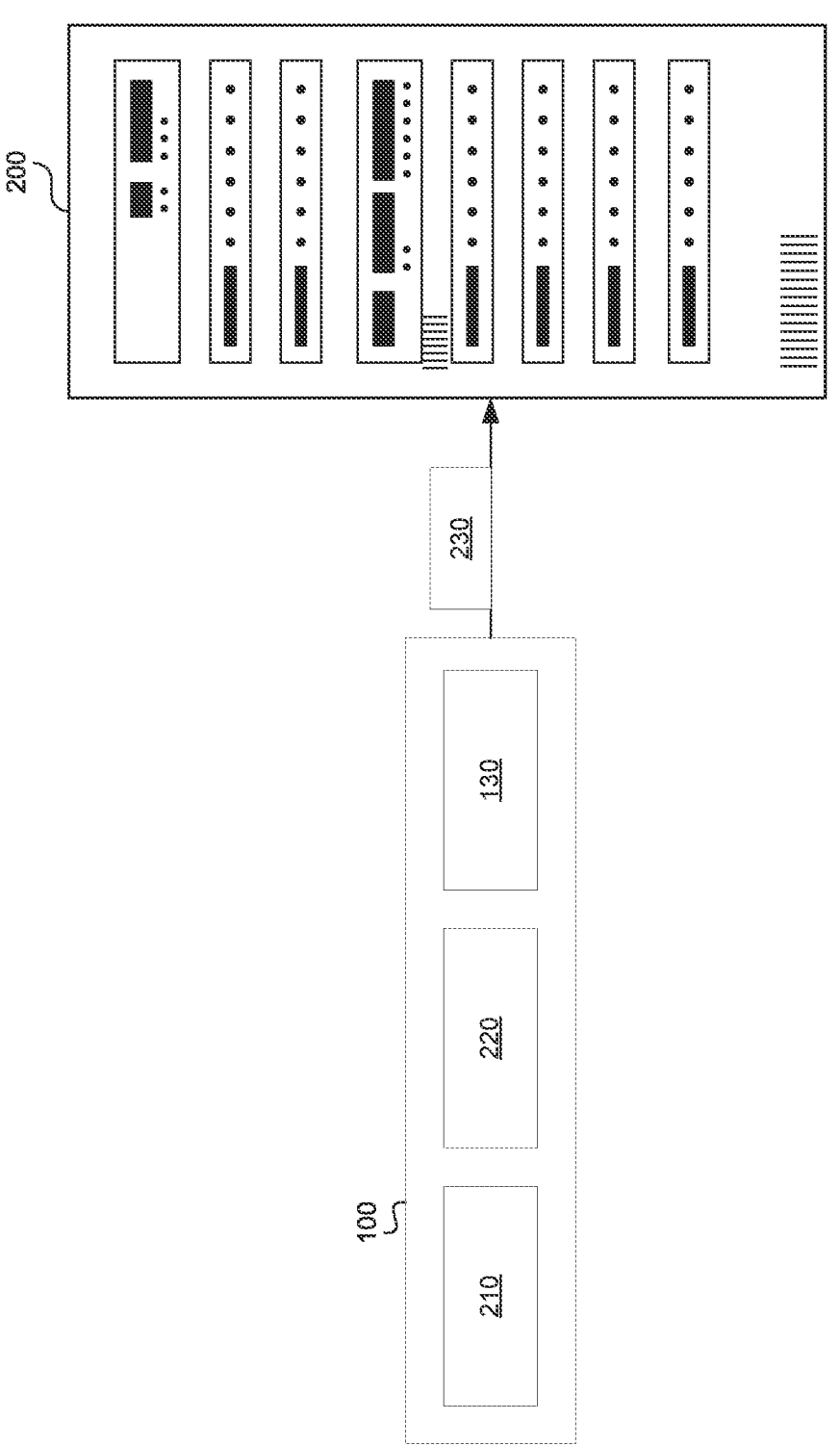
FIG. 2 shows the detachable unit in more detail.

FIG. 2 shows the detachable unit 100 in more detail. The detachable unit 100 can be PL143 and can include an accelerometer 210, a communication interface 220, such as a radio, and a battery 130. The accelerometer 210 can be inside the communication interface 220. Typically, the detachable unit 100 is used to provide time and location information while the vehicle 120 in FIG. 1 is moving around during a normal workday. The detachable unit 100 is attached to the vehicle 120 in a concealed position.

The detachable unit 100 operates in high-power mode during the time fence 110 in FIG. 1 and switches into low-power mode outside of the time fence 110 to preserve power and battery life. Upon detecting an unusual movement of the accelerometer 210 outside the time fence 110 in FIG. 1, the detachable unit 100 can generate a notification 230 of the unusual movement and transmit the notification to a central server 200. The central server 200 can be a cloud server and can be configured to store the data received from multiple detachable units 100.

For example, the accelerometer 210 can detect movement and alert the communication interface 220. The communication interface 220 can determine whether the current time is outside of the time fence 110. Upon determining that the current time is outside of the time fence, the communication interface 220 can generate the notification 230 indicating the detected movement.

In addition, the detachable unit 100 can also monitor whether the location of the vehicle is inside a geofence. A geofence is a virtual perimeter for a real-world geographic area defined by GPS or RFID technology that enables software to trigger a response when a mobile device enters or leaves a particular area. The geofence can be dynamically generated or match a predefined set of boundaries, such as a jobsite within which the vehicle is authorized to operate. The geofence can be continuous or broken into multiple noncontinuous regions. Once the vehicle leaves the geofence, the detachable unit 100 can generate a notification 230 and/or can increase the frequency of the communication 300, as described in FIG. 3 below.

Figure 3:
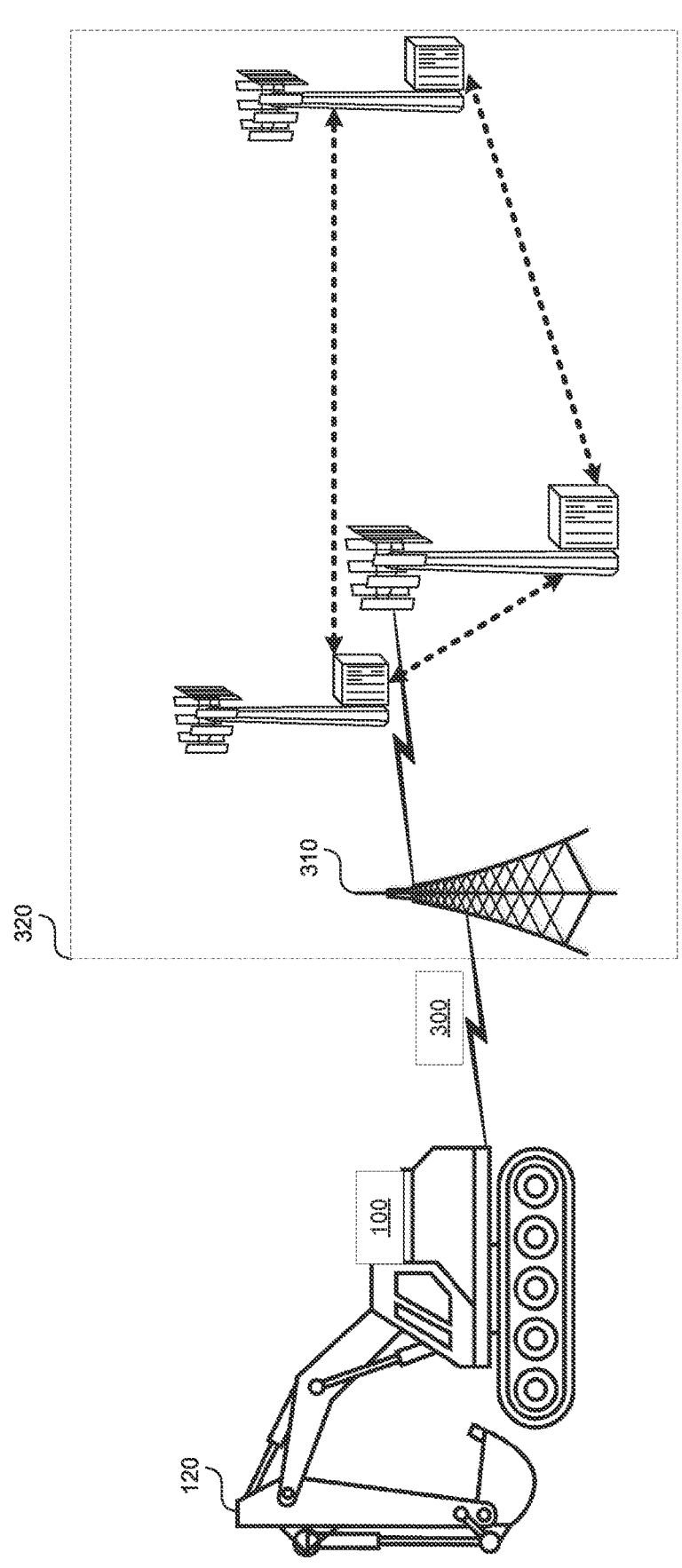
FIG. 3 shows adjusting the frequency of communication between the detachable unit and a cell tower.

FIG. 3 shows adjusting the frequency of communication between the detachable unit and a cell tower. While the detachable unit 100 is operating in the low-power mode 160 in FIG. 1, the detachable unit 100, e.g., the communications interface 220 in FIG. 2, can infrequently send a communication 300 to a cell tower 310, which is a part of a wireless telecommunication network 320. For example, in the low-power mode 160, the communication 300 may not be sent or can be sent every 4 hours. The communication 300, such as a message indicating the ID of the vehicle 120, can be used to locate the vehicle. The communication 300 can be an extended Discontinuous Reception (eDRX) message. The communication 300 can be sent less frequently while the vehicle 120 is operating in the low-power mode 160 to reduce battery consumption.

If the detachable unit 100 detects an unusual operation outside of the time fence 110 in FIG. 1, the detachable unit can switch to the high-power mode 170 in FIG. 1 and increase the frequency of the communications 300 sent to the cell tower 310. For example, the detachable unit 100 can increase the frequency of communications 300 to 10 times per minute. The frequency of communications 300 when in the high-power mode 170 can vary based on the value of the vehicle 120 to which the detachable unit 100 is attached. For example, the detachable unit 100 can receive an input indicating the frequency, where the input varies based on the value of the vehicle 120.

By receiving the communications 300 more frequently, the server 200 in FIG. 2 can more accurately track the location of the vehicle 120. Further, based on the frequent communications 300, the server 200 can determine when the vehicle 120 has stopped moving. The server 200 can notify authorities, such as the police, of the new location of the potentially stolen vehicle 120.

Figure 4:
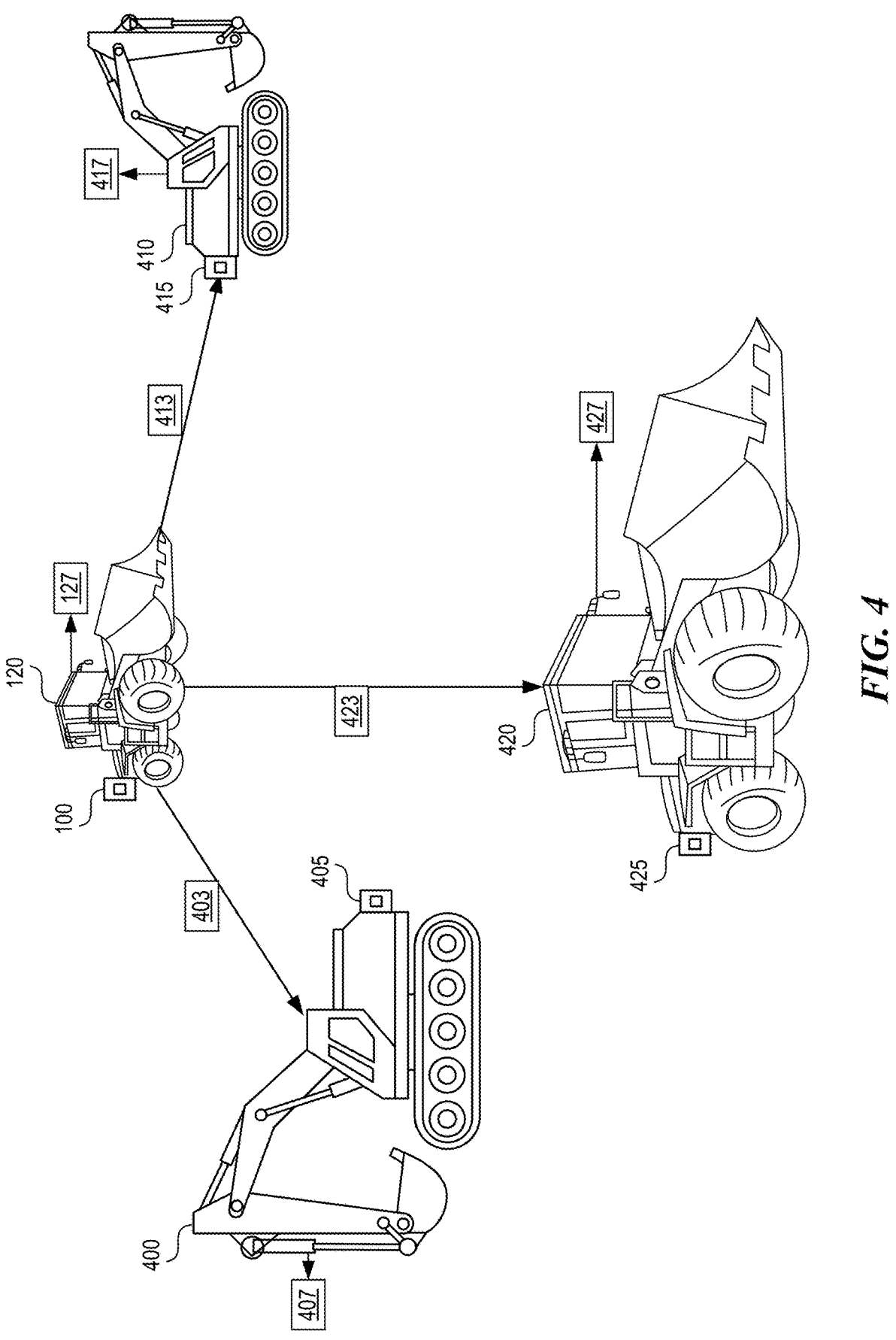
FIG. 4 shows a system to notify multiple vehicles after detecting an unusual operation outside of the time fence.

FIG. 4 shows a system to notify multiple vehicles after detecting an unusual operation outside of the time fence. After the detachable unit 100 associated with the vehicle 120 detects the unusual operation outside of the time fence 110 in FIG. 1, such as movement, operation, or acceleration of the vehicle, the vehicle 120 can send an indication 403, 413, 423 of the unusual operation to other detachable units 405, 415, 425 mounted on vehicles 400, 410, 420 within a predetermined area. The predetermined area can be a jobsite and can be defined as a geofence 430. The vehicles 400, 410, 420 can be at a geographically-proximal jobsite, but not necessarily at the same jobsite as the vehicle 120 that detected the unusual operation. The vehicles 400, 410, 420 can be located at a different worksite, or belong to a different owner/operator than the vehicle 120.

Upon receiving the notification, the detachable units 405, 415, 425 can switch to high-power mode and can send a notification of the unusual operation. The notification of the unusual operation can include a notification, e.g., an alert, to operators assigned to each of the detachable units. For example, each unit can have one or more operators 127, 407, 417, 427 assigned to the unit. The operator can be a person, a device, or an artificial intelligence in charge of monitoring operation and location of the vehicles 120, 400, 410, 420. The operators 127, 407, 417, 427 can overlap but can also be different. By notifying more operators 127, 407, 417, 427 of the unusual operation, the chances are increased that at least one operator will detect the notification and take the necessary step to address the situation.

Upon detecting the unusual operation, the detachable units 100, 405, 415, 425 can more frequently report their location to a cell tower of a wireless communication network. The detachable units 100, 405, 415, 425 can communicate with the same cell tower or different cell towers belonging to one or more wireless telecommunication networks. The frequency of communication can increase, as described in this application, and can depend on the value of the vehicles 120, 400, 410, 420. For example, in low-power mode, the detachable units 100, 405, 415, 425 can avoid sending location information to the cell tower or can send location information up to once every 2 hours. In high-power mode, upon detecting the unusual operation, the detachable units 100, 405, 415, 425 can send the indication of the location up to 10 times per minute.

The server 200 can receive the location information, and upon determining that the location of one or more vehicles 120, 400, 410, 420 has not changed within a predetermined time period, such as 1 hour, the server 200 can send a notification to the authorities, e.g., the police, to go to the last known location to retrieve the vehicle.

In addition to detecting theft, the detection of the unusual operation can be used to warm up the vehicles prior to the workday. Specifically, the detachable unit 100, 405, 415, 425 can determine whether the unusual operation occurs within a predetermined time period before the start of the time fence 110. The predetermined time period can be 30 minutes. If the unusual operation occurs 30 minutes before the start of the time fence, e.g., before the start of the workday, the detachable unit 100, 405, 415, 425 detecting the unusual operation can send a notification to the rest of the detachable unit to power up the corresponding vehicles 120, 400, 410, 420, thereby preparing the vehicles for the beginning of the workday.

Figure 5:
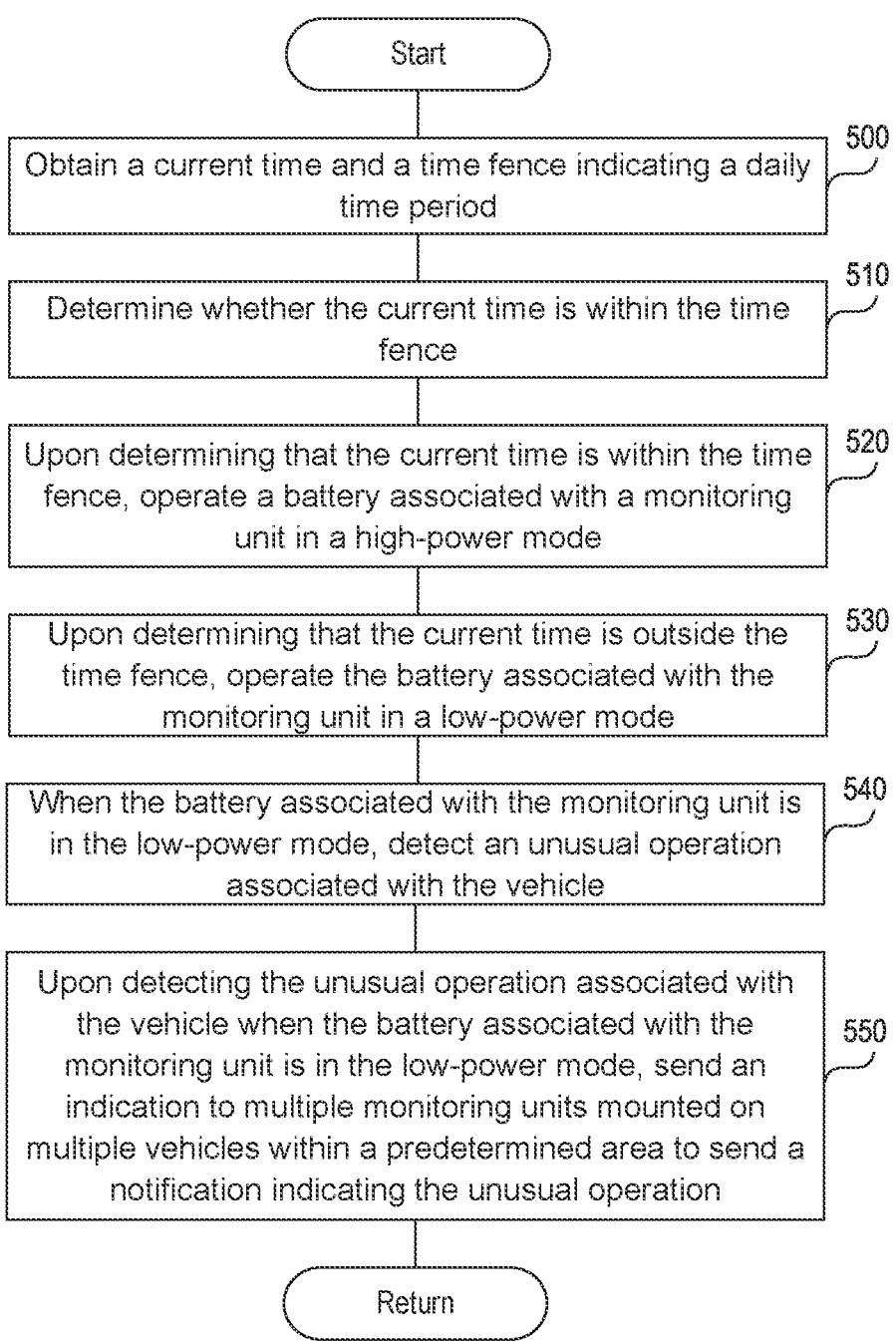
FIG. 5 is a flowchart of a method to detect unusual operation of a vehicle outside of a time fence and notify neighboring vehicles.

FIG. 5 is a flowchart of a method to detect unusual operation of a vehicle outside of a time fence and notifying neighboring vehicles. A hardware or software processor executing instructions describing this application can, in step 500, obtain a current time and a time fence indicating a daily time period. The time fence can be continuous, or broken out into various periods, such as 8 AM to 5 PM or 8 AM to noon and 1 PM to 5 PM. The processor can be associated with the monitoring unit and/or the vehicle.

In step 510, the processor can determine whether the current time is within the time fence. In step 520, upon determining that the current time is within the time fence, the processor can operate a battery associated with a monitoring unit in a high-power mode. The high-power mode is configured to enable a communication indicating a location associated with the vehicle. The monitoring unit can be configured to be coupled with a vehicle. The monitoring unit can be the detachable unit as described in this application and can attach and detach from the vehicle using various mechanisms. Alternatively, the monitoring unit can be integrated into the vehicle. The monitoring unit can include a radio, an accelerometer configured to detect the unusual operation, and the battery.

Upon determining that the current time is outside the time fence, in step 530, the processor can operate the battery associated with the monitoring unit in a low-power mode, where the low-power mode is configured to conserve battery life.

In step 540, when the battery associated with the monitoring unit is in the low-power mode, the processor can detect an unusual operation associated with the vehicle, where the unusual operation includes a movement associated with the vehicle occurring outside of the time fence.

In step 550, upon detecting the unusual operation associated with the vehicle when the battery associated with the monitoring unit is in the low-power mode, the processor can send an indication to multiple monitoring units mounted on multiple vehicles within a predetermined area to switch to the high-power mode and send a notification indicating the unusual operation. The predetermined area can be a jobsite and can be determined using geofencing.

The processor can cause a first monitoring unit among the multiple monitoring units to monitor a passage of time upon switching to the high-power mode in response to receiving the indication. The processor can cause the first monitoring unit among the multiple monitoring units to determine whether the passage of time exceeds a predetermined time period and whether, during the passage of time, no additional unusual operation is detected. The predetermined passage of time can be 5 minutes or more. Upon determining that the passage of time exceeds the predetermined time and that, during the passage of time, no additional unusual operation is detected, the processor can cause the first monitoring unit among the multiple monitoring units to switch to the low-power mode.

Upon detecting the unusual operation associated with the vehicle when the battery associated with the monitoring unit is in the low-power mode, the processor can facilitate obtaining an indication of a first operator associated with the vehicle and multiple operators associated with the multiple vehicles within the predetermined area. Each vehicle can have multiple operators associated with the vehicle. The operator can be a person, a program, an electronic device, or an artificial intelligence configured to receive notifications from the vehicles. The processor can facilitate notifying the first operator associated with the vehicle and the multiple operators associated with multiple vehicles that the unusual operation occurred. By notifying the first operator and the multiple operators, the processor increases the number of operators that can react to the unusual operation in case an operator misses the notification or does not perform an effective action to remedy the situation.

Upon detecting the unusual operation associated with the vehicle when the battery associated with the monitoring unit is in the low-power mode, the processor can determine whether the current time is within a predetermined time period before initiation of the time fence. Upon determining that the current time is within the predetermined time period before initiation of the time fence, the processor can avoid sending the indication of the unusual operation. Upon determining that the current time is within the predetermined time period before initiation of the time fence, the processor can power the vehicle and the multiple vehicles within the predetermined area, thereby enabling the vehicle and the multiple vehicles to warm up prior to commencing work.

Upon detecting the unusual operation associated with the vehicle when the battery associated with the monitoring unit is in the low-power mode, the processor can determine whether the current time is within a predetermined time period to the time fence. The predetermined time to the time fence can be half an hour. Upon determining that the current time is within the predetermined time period to the time fence, the processor can avoid sending the indication to the multiple monitoring units mounted on the multiple vehicles within the predetermined area. In this case, the processor can avoid raising an alarm when the operation of the vehicle may be legitimate by a worker who has started earlier on the job or who has stayed later.

While operating the battery associated with the monitoring unit in the low-power mode, the processor can facilitate reducing a frequency of communication between the monitoring unit and a cell tower associated with a first wireless telecommunication network and a frequency of multiple communications between the multiple monitoring units and one or more cell towers associated with a second wireless telecommunication network, where the communication and the multiple communications are configured to indicate a location associated with the vehicle and the multiple vehicles. The one or more cell towers can be the same as the cell tower or can include the cell tower. The first and the second wireless telecommunication networks can be the same or can be different. Upon detecting the unusual operation associated with the vehicle outside of the time fence, the processor can facilitate increasing a frequency of the communication between the monitoring units and the cell tower and a frequency of communication between the multiple monitoring units and the one or more cell towers, thereby enabling more frequent tracking of the location of the vehicle and the multiple vehicles. The frequency of communication between the vehicle and the cell tower associated with the wireless telecommunication network can be positively correlated with a value of the vehicle. For example, the more expensive the vehicle, the higher the frequency of communication. The frequency of communication can be as high as 10 times per minute and can be as low as once every 2 hours.

Industrial Applicability

The disclosed system detects an unusual operation, such as a movement of the vehicle, outside of a time fence. The time fence indicates a daily time period and can be continuous, e.g., from 8 AM to 5 PM, or broken out into various noncontinuous periods, such as 8 AM to noon and 1 PM to 5 PM. The disclosed system can be a detachable unit that includes a radio, an accelerometer configured to detect motion, and a battery, and it can be mounted on a vehicle such as a vehicle used in construction. The detachable unit is sufficiently small to be imperceptible and can be placed in an inconspicuous location, such as underneath the vehicle, so that when an unauthorized party tries to move the vehicle, the unauthorized party cannot easily detect the presence of the detachable unit and remove the detachable unit from the vehicle. Once the detachable unit detects the unusual operation, the detachable unit can send a notification to an operator of the unusual operation and, in addition, can notify other vehicles on the jobsite of the unusual operation. In response, the other vehicles on the jobsite can send their own notifications to their own operators. Further, in response to the unusual operation, all the vehicles can increase the frequency of communicating their location.

The disclosed system can obtain a current time and a time fence indicating a daily time period. The time fence can be continuous or broken out into various periods, such as 8 AM to 5 PM or 8 AM to noon and 1 PM to 5 PM. The system can determine whether the current time is within the time fence. Upon determining that the current time is within the time fence, the system can operate a battery associated with a monitoring unit in a high-power mode. The high-power mode is configured to enable a communication indicating a location associated with the vehicle. The monitoring unit can be configured to be coupled with the vehicle. The monitoring unit can be the detachable unit as described in this application and can attach and detach from the vehicle using various mechanisms. Alternatively, the monitoring unit can be integrated into the vehicle. The monitoring unit can include a radio, an accelerometer configured to detect the unusual operation, and the battery.

Upon determining that the current time is outside the time fence, the system can operate the battery associated with the monitoring unit in a low-power mode, where the low-power mode is configured to conserve battery life. When the battery associated with the monitoring unit is in the low-power mode, the system can detect an unusual operation associated with the vehicle, where the unusual operation includes a movement associated with the vehicle occurring outside of the time fence. Upon detecting the unusual operation associated with the vehicle when the battery associated with the monitoring unit is in the low-power mode, the system can send an indication to multiple monitoring units coupled to multiple vehicles within a predetermined area to switch to the high-power mode and send a notification indicating the unusual operation. The predetermined area can be a jobsite and can be determined using geofencing.

Computer System

Figure 6:
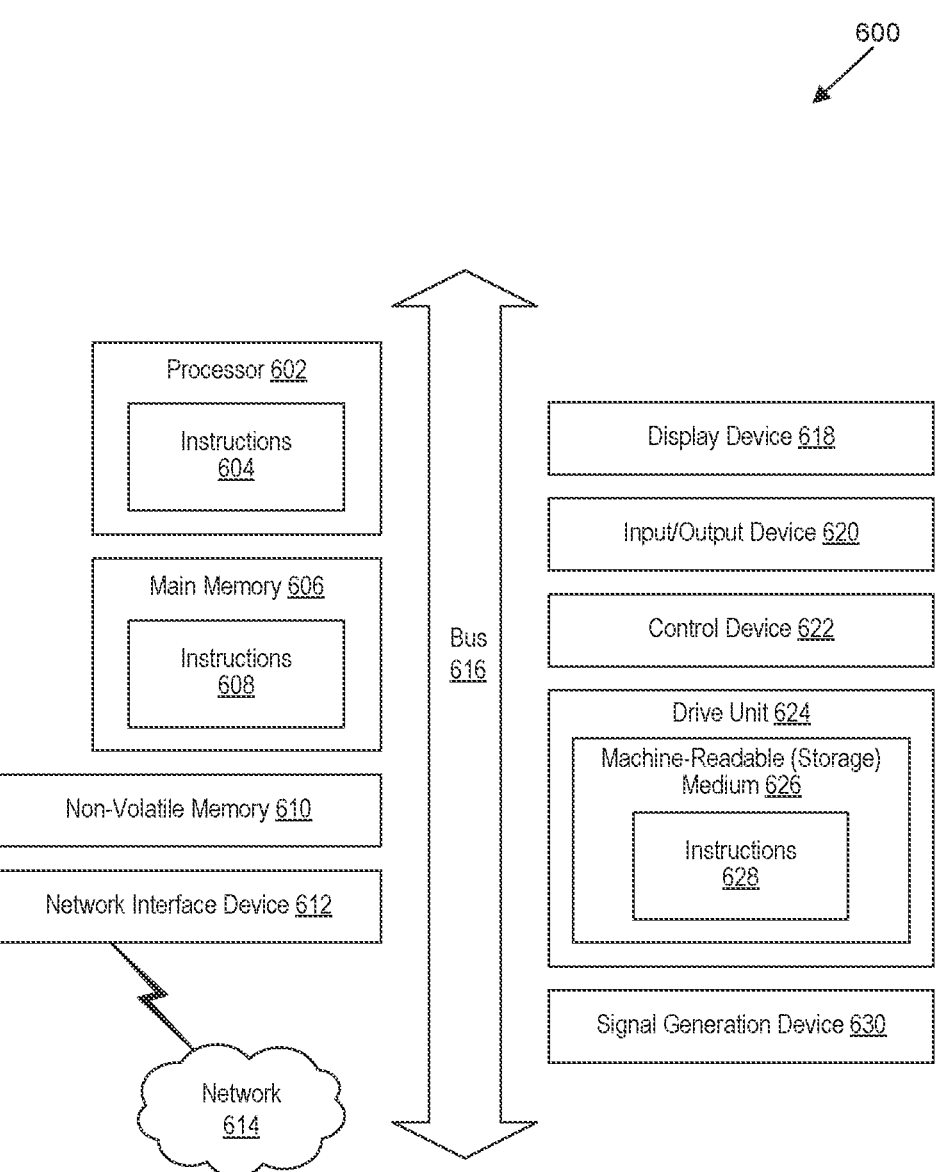
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, a display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the Figures and any other components described in this specification can be implemented.

The computer system 600 can take any suitable physical form. For example, the computer system 600 can share a similar architecture as that of a server computer, personal computer (PC), tablet computer, mobile telephone, game console, music player, wearable electronic device, network-connected ("smart") device (e.g., a television or home assistant device), augmented reality/virtual reality (AR/VR) systems (e.g., head-mounted display), or any electronic device capable of executing a set of instructions that specify action(s) to be taken by the computer system 600. In some implementations, the computer system 600 can be an embedded computer system, a system-on-chip (SOC), a single-board computer system (SBC), or a distributed system such as a mesh of computer systems, or it can include one or more cloud components in one or more networks. Where appropriate, one or more computer systems 600 can perform operations in real time, in near real time, or in batch mode.

The network interface device 612 enables the computer system 600 to mediate data in a network 614 with an entity that is external to the computer system 600 through any communication protocol supported by the computer system 600 and the external entity. Examples of the network interface device 612 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computer system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computer system 600 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

The invention claimed is:

1. A non-transitory, computer-readable storage medium storing instructions, which, when executed by at least one data processor of a system, cause the system to:

obtain, by a processor, a current time and a time fence indicating a daily time period;

determine, by the processor, whether the current time is within the time fence;

upon determining that the current time is within the time fence, operate, by the processor, a battery associated with a detachable unit in a high-power mode, wherein the detachable unit is configured to be mounted on a vehicle, wherein the high-power mode is configured to enable a communication indicating a location associated with the vehicle;

upon determining that the current time is outside the time fence, operate, by the processor, the battery associated with the detachable unit in a low-power mode, wherein the low-power mode is configured to conserve battery life;

when the battery associated with the detachable unit is in the low-power mode, detect, by an accelerometer, an unusual operation associated with the vehicle, wherein the unusual operation includes a movement associated with the vehicle occurring outside of the time fence; and upon detecting the unusual operation associated with the vehicle when the battery associated with the detachable unit is in the low-power mode, send, by the processor, an indication to multiple detachable units mounted on multiple vehicles within a predetermined area to switch to the high-power mode and to send a notification indicating the unusual operation associated with the vehicle, wherein the multiple vehicles are separate from the vehicle engaged in the unusual operation, and wherein the multiple vehicles are associated with multiple different operators; and cause, by the processor, multiple displays associated with multiple devices of the multiple different operators to display the notification indicating the unusual operation associated with the vehicle.

2. The non-transitory, computer-readable storage medium of claim 1, comprising instructions to:

cause a first detachable unit among the multiple detachable units to monitor a passage of time upon switching to the high-power mode in response to receiving the indication;

cause the first detachable unit among the multiple detachable units to determine whether the passage of time exceeds a predetermined time period and whether, during the passage of time, no additional unusual operation is detected; and upon determining that the passage of time exceeds the predetermined time period and that, during the passage of time, no additional unusual operation is detected, cause the first detachable unit among the multiple detachable units to switch to the low-power mode.

3. The non-transitory, computer-readable storage medium of claim 1, comprising instructions to:

upon detecting the unusual operation associated with the vehicle when the battery associated with the detachable unit is in the low-power mode, obtain an indication of a first operator associated with the vehicle and multiple operators associated with the multiple vehicles within the predetermined area; and notify the first operator associated with the vehicle and the multiple operators associated with the multiple vehicles that the unusual operation occurred.

4. The non-transitory, computer-readable storage medium of claim 1, comprising instructions to:

upon detecting the unusual operation associated with the vehicle when the battery associated with the detachable unit is in the low-power mode, determine whether the current time is within a predetermined time period before initiation of the time fence;

upon determining that the current time is within the predetermined time period before initiation of the time fence, avoid sending the indication; and upon determining that the current time is within the predetermined time period before the initiation of the time fence, power the vehicle and the multiple vehicles within the predetermined area, thereby enabling the vehicle and the multiple vehicles to warm up prior to commencing work.

5. The non-transitory, computer-readable storage medium of claim 1, comprising instructions to:

upon detecting the unusual operation associated with the vehicle when the battery associated with the detachable unit is in the low-power mode, determine whether the current time is within a predetermined time period to the time fence; and upon determining that the current time is within the predetermined time period to the time fence, avoid sending the indication to the multiple detachable units mounted on the multiple vehicles within the predetermined area.

6. The non-transitory, computer-readable storage medium of claim 1, comprising instructions to:

while operating the battery associated with the detachable unit in the low-power mode, facilitate reducing a frequency of communication between the detachable unit and a cell tower associated with a first wireless telecommunication network, and multiple frequencies of multiple communications between the multiple detachable units and one or more cell towers associated with a second wireless telecommunication network, wherein the communication and the multiple communications are configured to indicate multiple locations associated with the vehicle and the multiple vehicles; and upon detecting the unusual operation associated with the vehicle outside of the time fence, facilitate increasing the frequency of the communication between the multiple detachable units and the cell tower and the multiple frequencies of the multiple communications between the multiple detachable units and the one or more cell towers, thereby enabling more frequent tracking of the location of the vehicle and the multiple vehicles.

7. The non-transitory, computer-readable storage medium of claim 1, wherein the detachable unit includes a radio, an accelerometer configured to detect the unusual operation, and the battery.

8. A method comprising:

obtaining, by a processor, a current time and a time fence indicating a daily time period;

determining, by the processor, whether the current time is within the time fence;

upon determining that the current time is within the time fence, operating, by the processor, a battery associated with a monitoring unit in a high-power mode, wherein the monitoring unit is configured to be coupled with a vehicle, wherein the high-power mode is configured to enable a communication indicating a location associated with the vehicle;

upon determining that the current time is outside the time fence, operating, by the processor, the battery associated with the monitoring unit in a low-power mode, wherein the low-power mode is configured to conserve battery life;

when the battery associated with the monitoring unit is in the low-power mode, detecting, by an accelerometer, an unusual operation associated with the vehicle, wherein the unusual operation includes a movement associated with the vehicle occurring outside of the time fence; and upon detecting the unusual operation associated with the vehicle when the battery associated with the monitoring unit is in the low-power mode, sending, by the processor, an indication to multiple monitoring units coupled to multiple vehicles within a predetermined area to send a notification indicating the unusual operation, wherein the multiple vehicles are separate from the vehicle engaged in the unusual operation, and wherein the multiple vehicles are associated with multiple different operators; and causing, by the processor, multiple displays associated with multiple devices of the multiple different operators to display the notification indicating the unusual operation associated with the vehicle.

9. The method of claim 8, comprising:

causing a first monitoring unit among the multiple monitoring units to monitor a passage of time upon switching to the high-power mode in response to receiving the indication;

causing the first monitoring unit among the multiple monitoring units to determine whether the passage of time exceeds a predetermined time period and whether, during the passage of time, no additional unusual operation is detected; and upon determining that the passage of time exceeds the predetermined time period and that, during the passage of time, no additional unusual operation is detected, causing the first monitoring unit among the multiple monitoring units to switch to the low-power mode.

10. The method of claim 8, comprising:

upon detecting the unusual operation associated with the vehicle when the battery associated with the monitoring unit is in the low-power mode, facilitating obtaining an indication of a first operator associated with the vehicle and multiple operators associated with the multiple vehicles within the predetermined area; and facilitating notifying the first operator associated with the vehicle and the multiple operators associated with the multiple vehicles that the unusual operation occurred.

11. The method of claim 8, comprising:

upon detecting the unusual operation associated with the vehicle when the battery associated with the monitoring unit is in the low-power mode, determining whether the current time is within a predetermined time period before initiation of the time fence;

upon determining that the current time is within the predetermined time period before initiation of the time fence, avoiding sending the indication; and upon determining that the current time is within the predetermined time period before initiation of the time fence, facilitating powering of the vehicle and the multiple vehicles within the predetermined area, thereby enabling the vehicle and the multiple vehicles to warm up prior to commencing work.

12. The method of claim 8, comprising:

upon detecting the unusual operation associated with the vehicle when the battery associated with the monitoring unit is in the low-power mode, determining whether the current time is within a predetermined time period to the time fence; and upon determining that the current time is within the predetermined time period to the time fence, avoiding sending the indication to the multiple monitoring units coupled to the multiple vehicles within the predetermined area.

13. The method of claim 8, comprising:

while operating the battery associated with the monitoring unit in the low-power mode, facilitating reducing a frequency of communication between the monitoring unit and a cell tower associated with a first wireless telecommunication network, and multiple frequencies of multiple communications between the multiple monitoring units and one or more cell towers associated with a second wireless telecommunication network, wherein the communication and the multiple communications are configured to indicate multiple locations associated with the vehicle and the multiple vehicles; and upon detecting the unusual operation associated with the vehicle outside of the time fence, facilitating increasing the frequency of the communication between the multiple monitoring units and the cell tower and the multiple frequencies of the multiple communications between the multiple monitoring units and the one or more cell towers, thereby enabling more frequent tracking of the location of the vehicle and the multiple vehicles.

14. A system comprising:

at least one hardware processor; and at least one non-transitory memory storing instructions, which, when executed by the at least one hardware processor, cause the system to:

obtain a current time and a time fence indicating a daily time period;

determine whether the current time is within the time fence;

upon determining that the current time is within the time fence, operate a battery associated with a monitoring unit in a high-power mode, wherein the monitoring unit is configured to be coupled with a vehicle, wherein the high-power mode is configured to enable a communication indicating a location associated with the vehicle;

upon determining that the current time is outside the time fence, operate the battery associated with the monitoring unit in a low-power mode, wherein the low-power mode is configured to conserve battery life;

when the battery associated with the monitoring unit is in the low-power mode, detect, by an accelerometer, an unusual operation associated with the vehicle, wherein the unusual operation includes a movement associated with the vehicle occurring outside of the time fence; and upon detecting the unusual operation associated with the vehicle when the battery associated with the monitoring unit is in the low-power mode, send an indication to multiple monitoring units coupled to multiple vehicles within a predetermined area to send a notification indicating the unusual operation, wherein the multiple vehicles are separate from the vehicle engaged in the unusual operation, and wherein the multiple vehicles are associated with multiple different operators; and cause, by the processor, multiple displays associated with multiple devices of the multiple different operators to display the notification indicating the unusual operation associated with the vehicle.

15. The system of claim 14, comprising instructions to:

cause a first monitoring unit among the multiple monitoring units to monitor a passage of time upon switching to the high-power mode in response to receiving the indication;

cause the first monitoring unit among the multiple monitoring units to determine whether the passage of time exceeds a predetermined time period and whether, during the passage of time, no additional unusual operation is detected; and upon determining that the passage of time exceeds the predetermined time period and that, during the passage of time, no additional unusual operation is detected, cause the first monitoring unit among the multiple monitoring units to switch to the low-power mode.

16. The system of claim 14, comprising instructions to:

upon detecting the unusual operation associated with the vehicle when the battery associated with the monitoring unit is in the low-power mode, facilitate obtaining an indication of a first operator associated with the vehicle and multiple operators associated with the multiple vehicles within the predetermined area; and facilitate notifying the first operator associated with the vehicle and the multiple operators associated with the multiple vehicles that the unusual operation occurred.

17. The system of claim 14, comprising instructions to:

upon detecting the unusual operation associated with the vehicle when the battery associated with the monitoring unit is in the low-power mode, determine whether the current time is within a predetermined time period before initiation of the time fence;

upon determining that the current time is within the predetermined time period before initiation of the time fence, avoid sending the indication; and upon determining that the current time is within the predetermined time period before initiation of the time fence, facilitate powering of the vehicle and the multiple vehicles within the predetermined area, thereby enabling the vehicle and the multiple vehicles to warm up prior to commencing work.

18. The system of claim 14, comprising instructions to:

upon detecting the unusual operation associated with the vehicle when the battery associated with the monitoring unit is in the low-power mode, determine whether the current time is within a predetermined time period to the time fence; and upon determining that the current time is within the predetermined time period to the time fence, avoid sending the indication to the multiple monitoring units coupled to the multiple vehicles within the predetermined area.

19. The system of claim 14, comprising instructions to:

while operating the battery associated with the monitoring unit in the low-power mode, facilitate reducing a frequency of communication between the monitoring unit and a cell tower associated with a first wireless telecommunication network, and multiple frequencies of multiple communications between the multiple monitoring units and one or more cell towers associated with a second wireless telecommunication network, wherein the communication and the multiple communications are configured to indicate multiple locations associated with the vehicle and the multiple vehicles; and upon detecting the unusual operation associated with the vehicle outside of the time fence, facilitate increasing the frequency of the communication between the multiple monitoring units and the cell tower and the multiple frequencies of the multiple communications between the multiple monitoring units and the one or more cell towers, thereby enabling more frequent tracking of the location of the vehicle and the multiple vehicles.

20. The system of claim 14, wherein the monitoring unit includes a radio, an accelerometer configured to detect the unusual operation, and the battery.

* * * * *